(12) United States Patent
Tai

(10) Patent No.: US 11,983,713 B2
(45) Date of Patent: May 14, 2024

(54) BLOCKCHAIN TRANSACTION PRIVACY PROTECTION METHOD AND BLOCKCHAIN NODE DEVICE

(71) Applicant: HON HAI PRECISION INDUSTRY CO., LTD., New Taipei (TW)

(72) Inventor: Yuhg-Chang Tai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 429 days.

(21) Appl. No.: 17/202,711

(22) Filed: Mar. 16, 2021

(65) Prior Publication Data
US 2021/0374739 A1   Dec. 2, 2021

(30) Foreign Application Priority Data
May 29, 2020   (CN) .................... 202010476747.X

(51) Int. Cl.
  *G06Q 20/00*   (2012.01)
  *G06Q 20/36*   (2012.01)
  *G06Q 20/40*   (2012.01)

(52) U.S. Cl.
  CPC ......... *G06Q 20/401* (2013.01); *G06Q 20/363* (2013.01); *G06Q 2220/00* (2013.01)

(58) Field of Classification Search
  CPC . G06Q 20/401; G06Q 20/363; G06Q 2220/00
  See application file for complete search history.

(56) References Cited

U.S. PATENT DOCUMENTS

2017/0236104 A1* 8/2017 Biton .................. G06Q 20/389
                                                                  705/64
2020/0134586 A1* 4/2020 Wu ....................... H04L 9/0825
(Continued)

FOREIGN PATENT DOCUMENTS

| CN | 110264186 | 9/2019 |
| CN | 111028081 | 4/2020 |
| CN | 111047444 | 4/2020 |

OTHER PUBLICATIONS

Peterson, Matthew, Blockchain and the future of financial services, 2018, The Journal of Wealth Management, 21(1), 124-131., Pageant Media (Year: 2018).*

*Primary Examiner* — Matthew L Hamilton
(74) *Attorney, Agent, or Firm* — ScienBiziP, P.C.

(57) ABSTRACT

A blockchain transaction privacy protection method includes receiving a transaction request sent by a receiving node device, the request including a plurality of receiving accounts and a total amount receivable, and sending a plurality of transaction sequence numbers and a virtual wallet address corresponding to each of the plurality of transaction sequence numbers to the receiving node device, thereby making the receiving node device send a total amount receivable, the plurality of transaction sequence numbers, and the virtual wallet address corresponding to the plurality of transaction sequence numbers to a granting node device. A total amount receivable and the plurality of transaction sequence numbers sent by the granting node device are received. A transaction amount to each receiving account of the receiving node device according to the total amount receivable and the plurality of transaction sequence numbers are transferred, protecting the amount of the transaction and the parties.

6 Claims, 7 Drawing Sheets

(56) References Cited

U.S. PATENT DOCUMENTS

2022/0020008 A1\* 1/2022 Bai ........................ G06Q 20/02
2022/0051240 A1\* 2/2022 Shamai ................. H04L 9/3239

\* cited by examiner

Transaction Record Table 1

| transaction sequence numbers | transaction address | transaction amount | new transaction sequence numbers |
|---|---|---|---|
| AAA | virtual wallet 1 | 500 | BBB |
| AAA | Virtual wallet2 | 200 | CCC |
| BBB | receiving account1 | 200 | |
| BBB | receiving account2 | 300 | |
| CCC | receiving account1 | 200 | |

Transaction Record Table 2

| transaction sequence numbers | transaction address | transaction amount | new transaction sequence numbers |
|---|---|---|---|
| T0 | Virtual wallet0 | 1000 | T1 |
| T1 | Virtual wallet1 | 600 | T2 |
| T1 | Virtual wallet2 | 400 | T3 |
| T2 | Virtual wallet3 | 400 | T4 |
| T2 | receiving account1 | 200 | |
| T3 | Virtual wallet4 | 300 | T5 |
| T3 | receiving account2 | 100 | |
| T4 | receiving account1 | 100 | |
| T4 | receiving account2 | 300 | |
| T5 | receiving account1 | 100 | |
| T5 | receiving account2 | 200 | |

FIG. 4

BLOCKCHAIN TRANSACTION PRIVACY PROTECTION METHOD AND BLOCKCHAIN NODE DEVICE

FIELD

The present disclosure relates to a technical field of blockchain technology, specifically a blockchain transaction privacy protection method and a blockchain node device.

BACKGROUND

In blockchain technology, transaction data is rendered genuine and unalterable by being uploaded to the blockchain. However, such a configuration may allow any blockchain node device in the blockchain network to obtain the transaction data, the transaction amount, and the account addresses of both parties, etc.

Although existing technology uses encryption algorithms to encrypt the transaction data to ensure security and privacy of the transaction data, the encryption algorithms may be easy to crack and have a low level of security which does not provide optimal protection of the actual transaction data.

BRIEF DESCRIPTION OF THE DRAWINGS

FIG. 4 shows a schematic diagram of a transaction record table according to a second embodiment of the present disclosure.

DETAILED DESCRIPTION

The drawings are to be combined with the detailed description to illustrate the embodiments of the present disclosure hereinafter. It is noted that embodiments of the present disclosure and features of the embodiments can be combined when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Optionally, the method of the present disclosure is applied to one or more blockchain node devices. The blockchain node device includes hardware such as a microprocessor and an Application Specific Integrated Circuit (ASIC), Field-Programmable Gate Array (FPGA), Digital Signal Processor (DSP), embedded devices, etc., but is not limited thereto.

The blockchain node device may be a device such as a desktop computer, a notebook, a palmtop computer, or a cloud server. The computer device can interact with users through a keyboard, a mouse, a remote control, a touch panel, or a voice control device.

Figure 1:
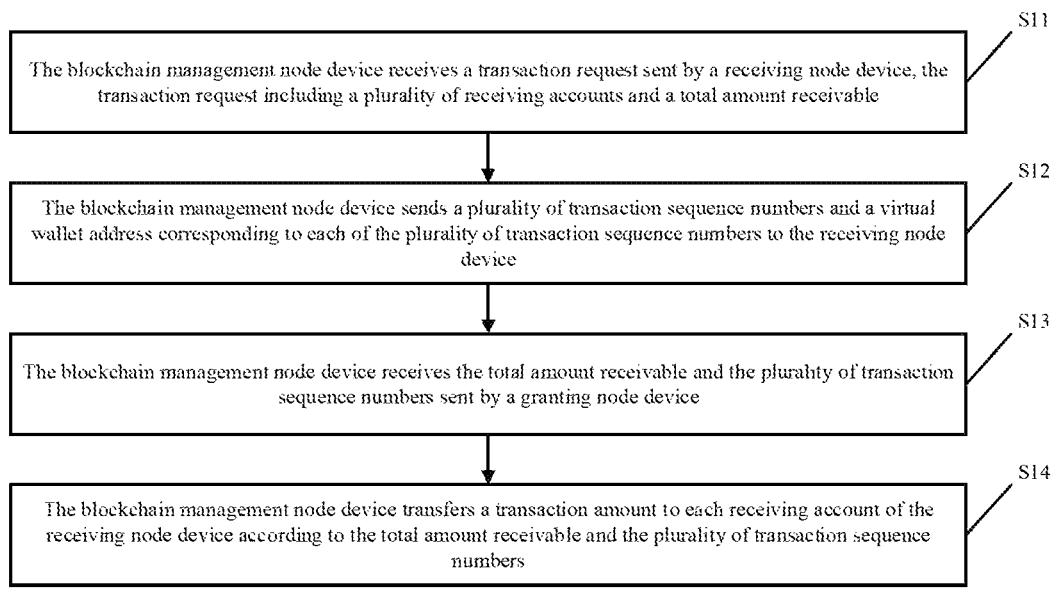
FIG. 1 shows a flowchart of a blockchain transaction privacy protection method according to an embodiment of the present disclosure.

FIG. 1 is a flowchart of a blockchain transaction privacy protection method according to an embodiment of the present disclosure. The method is applied to blockchain management node devices. According to different needs, the order of the steps in the flowchart can be changed and some can be omitted.

In block S11, the blockchain management node device receives a transaction request sent by a receiving node device, the transaction request including a plurality of receiving accounts and a total amount receivable.

A blockchain system can include one blockchain management node device, receiving node devices, and granting node devices. The blockchain management node device functions as an intermediate medium to split a total amount receivable sent by a granting node device into a plurality of transaction amounts, and individual transaction amounts within a plurality of virtual wallets are transferred to receiving accounts of a receiving node device. The receiving accounts are the available accounts of the receiving party, and the total amount receivable is a sum of the amount that the granting party must transfer to the receiving party.

The receiving node device sends the transaction request to the blockchain management node device to request virtual wallet addresses and transaction sequence numbers, thereby the granting node device can perform one or more transfers according to the virtual wallet addresses and the transaction sequence numbers.

In an optional embodiment, after the blockchain management node device receives the transaction request sent by the receiving node device, the method can further include: the blockchain management node device generates a plurality of transaction sequence numbers and a virtual wallet corresponding to each transaction sequence number in response to the transaction request.

Figures 2, 3:
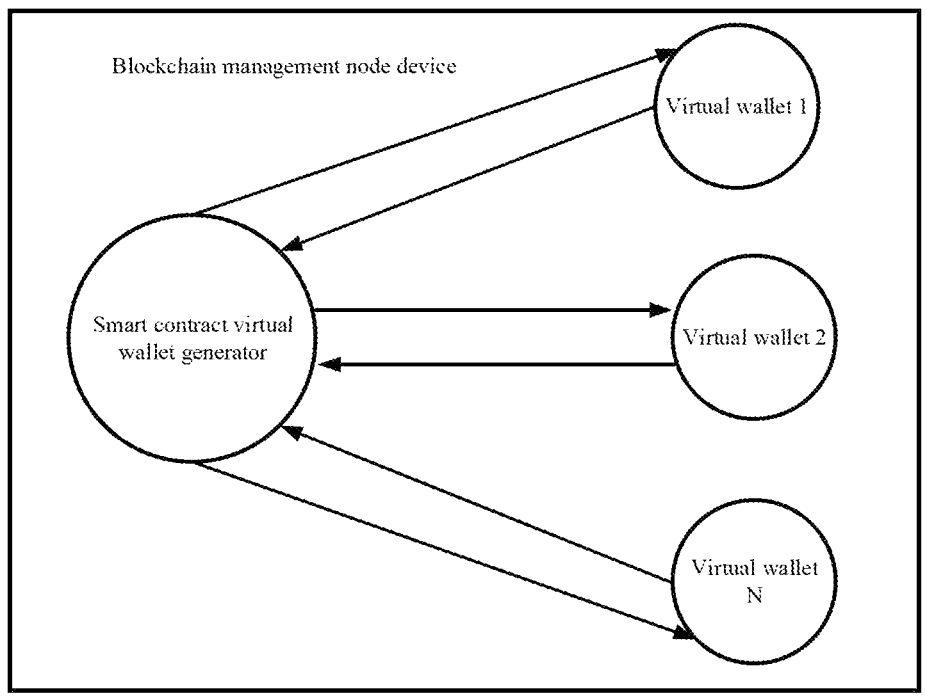
FIG. 2 shows a data flow diagram of a first embodiment of the method of the present disclosure.
FIG. 3 shows a schematic diagram of a transaction record table according to a first embodiment of the present disclosure.

As shown in FIG. 2, the receiving node device sends a transaction request to the blockchain management node device. After receiving the transaction request, the blockchain management node device calls the smart contract virtual wallet generator to generate a plurality of virtual wallets (for example, a virtual wallet 1, a virtual wallet 2, a virtual wallet 3), and returns a plurality of transaction sequence numbers and the virtual wallet address corresponding to the plurality of transaction sequence numbers to the receiving node device.

In an optional embodiment, the blockchain management node device generating the plurality of transaction sequence numbers and the virtual wallet corresponding to each transaction sequence number in response to the transaction request includes:

Randomly generating the plurality of transaction sequence numbers in response to the transaction request;

Calling up a smart contract virtual wallet generator to generate a plurality of virtual wallets;

Assigning at least one transaction address for each transaction sequence number;

Setting a transaction amount and assigning a new transaction sequence number for each transaction address;

Associating the transaction sequence number, the transaction address, the transaction amount, and the assigned new transaction sequence number in a transaction record table.

In this optional embodiment, the transaction address may be a virtual wallet address or a receiving account.

In conjunction with transaction record table 1 shown in FIG. 3, the blockchain management node device randomly generates three transaction sequence numbers AAA, BBB, and CCC in response to the transaction request. Among these, the transaction sequence number AAA corresponds to two transaction addresses (a virtual wallet 1 and a virtual wallet 2), the transaction sequence number BBB corresponds to two transaction addresses (a receiving account 1 and a receiving account 2), and the transaction sequence number CCC corresponds to one transaction address (a receiving account 1). For the transaction address "virtual wallet 1", a specified transaction amount is 500 and a specified new transaction sequence number is BBB, and for the transaction address "Virtual Wallet 2", a specified transaction amount is 200 and a specified new transaction sequence number is CCC.

In block S12, the blockchain management node device sends a plurality of transaction sequence numbers and a virtual wallet address corresponding to each of the plurality of transaction sequence numbers to the receiving node device.

After the receiving node device receives the plurality of transaction sequence numbers and the virtual wallet address corresponding to the plurality of transaction sequence numbers, the receiving node device sends the total amount receivable, the plurality of transaction sequence numbers, and the virtual wallet address corresponding to the plurality of transaction sequence numbers to the granting node device.

In block S13, the blockchain management node device receives the total amount receivable and the plurality of transaction sequence numbers sent by a granting node device.

In an optional embodiment, the blockchain management node device receiving the total amount receivable and the plurality of transaction sequence numbers sent by the granting node device includes: receiving the total amount receivable and the plurality of transaction sequence numbers through a virtual wallet corresponding to the virtual wallet address.

In block S14, the blockchain management node device transfers a transaction amount to each receiving account of the receiving node device according to the total amount receivable and the plurality of transaction sequence numbers.

A sum of the transaction amount transferred by the blockchain management node device to each receiving account of the receiving node device is the total amount receivable.

In an optional embodiment, the blockchain management node device transferring the transaction amount to each receiving account of the receiving node device according to the total amount receivable and the plurality of transaction sequence numbers includes:

Querying a new transaction sequence number corresponding to the plurality of transaction sequence numbers according to the transaction record table;

Determining a new transaction amount and a new transaction address corresponding to the new transaction sequence number;

Determining whether the new transaction address is a virtual wallet address or a receiving account;

When the new transaction address is determined to be one of the plurality of receiving accounts, transferring the new transaction amount to the new transaction address;

When the new transaction address is determined to be a virtual wallet address, transferring the new transaction amount to a virtual wallet corresponding to the new transaction address; querying a next new transaction sequence number corresponding to the new transaction address; performing a transfer operation according to the next new transaction sequence number and the transferred new transaction amount, until final transfer to the plurality of receiving accounts.

After receiving the transferred amount, each virtual wallet sends a query request carrying a transaction sequence number to the smart contract virtual wallet generator. The smart contract virtual wallet generator queries the transaction record table to obtain a query result including a next transaction address, transaction amount, and a next transaction sequence number corresponding to the transaction sequence number. The smart contract virtual wallet generator feeds back the query result to the virtual wallet. Then the virtual wallet performs a transfer operation corresponding to the next transaction sequence number.

In the above embodiment, the blockchain management node device is used as an intermediary to split the total amount receivable into a plurality of virtual wallets, and through the plurality of virtual wallets to complete the transfer operation to the granting node device, so it is impossible to intuitively determine the account addresses of both parties in the transaction, thereby protecting the privacy of both parties.

Figure 5:
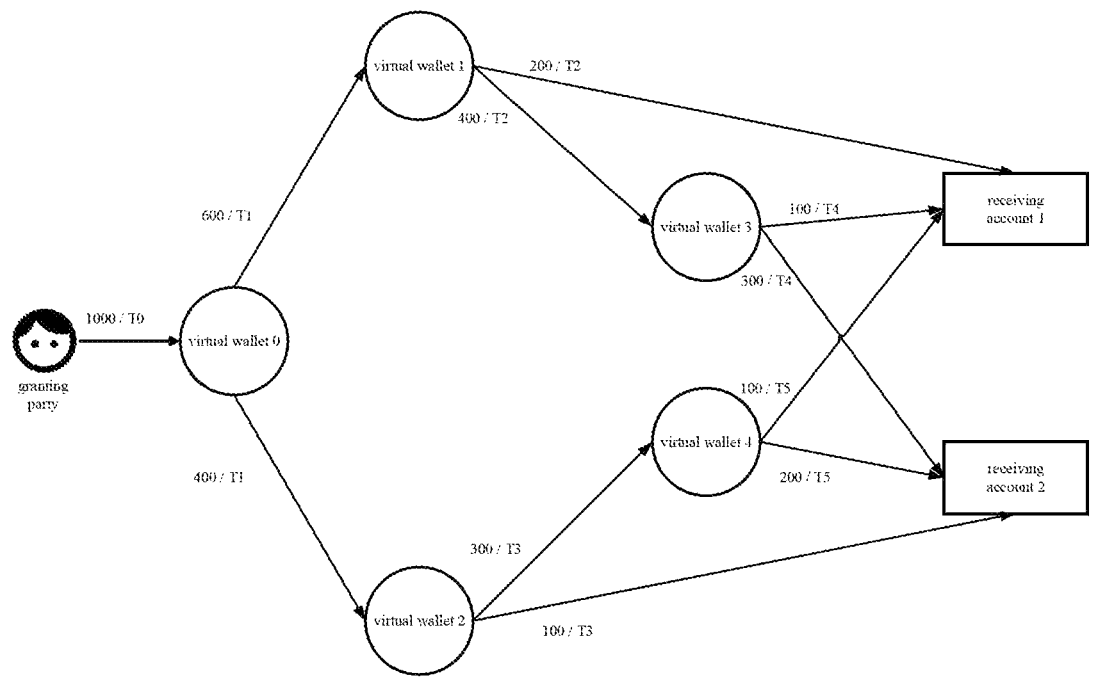
FIG. 5 shows a schematic diagram of a blockchain management node device splitting a total amount receivable according to an embodiment of the present disclosure.

The following describes the blockchain transaction privacy protection method provided in the present disclosure, with reference to FIG. 4 and FIG. 5.

Assuming that the receiving node device sends a transaction request to the blockchain management node device, the transaction request carries a receiving account 1, a receiving account 2 and a total amount receivable 1000, and the blockchain management node device, in response to the transaction request, calls the smart contract virtual wallet generator to generate 5 virtual wallets (a virtual wallet 0, a virtual wallet 1, a virtual wallet 2, a virtual wallet 3, and a virtual wallet 4), and randomly generates 6 transaction sequence numbers (T0, T1, T2, T3, T4, T5), the association relationship between each transaction sequence number and the transaction address, transaction amount, and new transaction sequence number being recorded in a transaction record table 2 as shown in FIG. 4.

In a first step, the blockchain management node device sends the transaction sequence number T0 and a virtual wallet address 0 corresponding to the virtual wallet 0 to the receiving node device, and the receiving node device sends a transaction amount 1000, the transaction sequence number T0, and the virtual wallet address 0 to the granting node device.

In a second step, the granting node device sends the transaction amount 1000 and the transaction sequence number T0 to the virtual wallet 0 corresponding to the virtual wallet address 0.

In a third step, the virtual wallet 0 corresponding to the virtual wallet address 0 sends a query request carrying the transaction sequence number T0 to the smart contract virtual wallet generator. The smart contract virtual wallet generator queries the transaction record table 2 for the first time and obtains a result of first query: the transaction sequence number T0 corresponds to the new transaction sequence number T1, and the transaction sequence number T1 corresponds to two transaction addresses (the virtual wallet 1, 600, the new transaction sequence number T2; the virtual wallet 2, 400, the new transaction sequence number T3). The smart contract virtual wallet generator feeds back the result of first query to the virtual wallet 0 corresponding to the virtual wallet address 0. Then the virtual wallet 0 corresponding to the virtual wallet address 0 performs the transfer operation corresponding to the transaction sequence number T1: transfers 600 to the virtual wallet 1 corresponding to the virtual wallet address 1 and transfers 400 to the virtual wallet 2 corresponding to the virtual wallet address 2.

In a fourth step, the virtual wallet 1 corresponding to the virtual wallet address 1 sends a query request carrying the transaction sequence number T2 to the smart contract virtual wallet generator. The smart contract virtual wallet generator queries the transaction record table 2 for the second time and obtains a result of second query: the transaction sequence number T2 corresponds to two transaction addresses (the virtual wallet 3, 400, new transaction sequence number T4; receiving account 1, 200). The smart contract virtual wallet generator feeds back the result of second query to the virtual wallet 1 corresponding to the virtual wallet address 1. Then the virtual wallet 1 corresponding to the virtual wallet address 1 performs the transfer operation corresponding to the transaction sequence number T2: transfers 400 to the virtual wallet 3 corresponding to the virtual wallet address 3, and transfers 200 to the receiving account 1 as the transaction address.

In a fifth step, the virtual wallet 2 corresponding to the virtual wallet address 2 sends a query request carrying the transaction sequence number T3 to the smart contract virtual wallet generator. The smart contract virtual wallet generator queries the transaction record table 2 for the third time and obtains a result of third query: the transaction sequence number T3 corresponds to two transaction addresses (the virtual wallet 4, 300, new transaction sequence number 15; the receiving account 2, 100). The smart contract virtual wallet generator feeds back the result of third query to the virtual wallet of which the transaction address is virtual wallet 2. Then the virtual wallet 2 corresponding to the virtual wallet address 2 performs the transfer operation corresponding to the transaction sequence number T3: transfers 300 to the virtual wallet 4 corresponding to the virtual wallet address 4, and transfers 100 to the receiving account 2 as the transaction address.

In a sixth step, the virtual wallet 3 corresponding to the virtual wallet address 3 sends a query request carrying the transaction sequence number T4 to the smart contract virtual wallet generator. The smart contract virtual wallet generator queries the transaction record table 2 for the fourth time and obtains a result of fourth query: the transaction sequence number T4 corresponds to two transaction addresses (the receiving account 1, 100; the receiving account 2, 300). The smart contract virtual wallet generator feeds back the result of fourth query to the virtual wallet 3 corresponding to the virtual wallet address 3. Then the virtual wallet 3 corresponding to the virtual wallet address 3 performs the transfer operation corresponding to the transaction sequence number T4: transfers 100 to the receiving account 1 and transfers 300 to the receiving account 2.

In a seventh step, the virtual wallet 4 corresponding to the virtual wallet address 4 sends a query request carrying the transaction sequence number T5 to the smart contract virtual wallet generator. The smart contract virtual wallet generator queries the transaction record table 2 for the fifth time and obtains a result of fifth query: the transaction sequence number T5 corresponds to two transaction addresses (the receiving account 1, 100; the receiving account 2, 200). The smart contract virtual wallet generator feeds back the result of fifth query to the virtual wallet 4 corresponding to the virtual wallet address 4. Then the virtual wallet 4 corresponding to the virtual wallet address 4 performs the transfer operation corresponding to the transaction sequence number T5: transfers 100 to the receiving account 1 and transfers 200 to the receiving account 2.

So far, transaction amount of 400 has been transferred into the receiving account 1, and transaction amount of 600 has been transferred into the receiving account 2.

The foregoing embodiments illustrate a transaction between a receiving node device and a granting node device. A transaction between a plurality of receiving node devices and one granting node device, a transaction between one receiving node device and a plurality of granting node devices, and a transaction between a plurality of receiving node devices and a plurality of granting node devices can take place with the same procedure.

Figure 6:
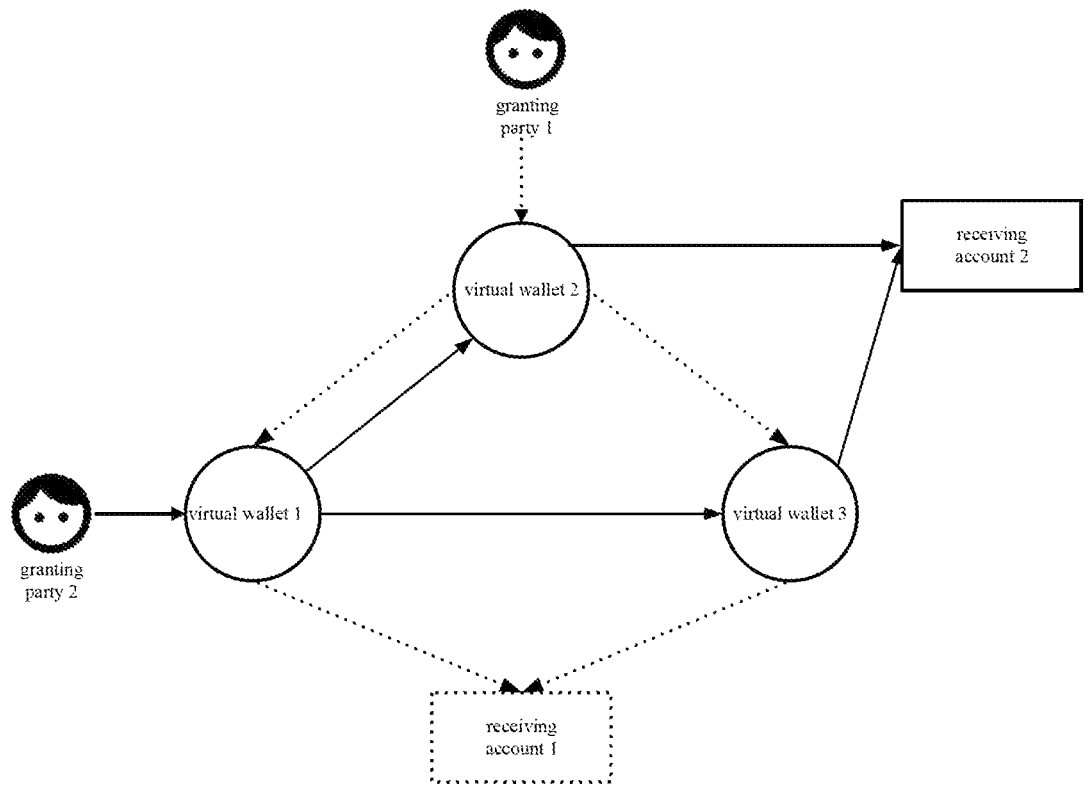
FIG. 6 shows a schematic diagram of a simultaneous transaction performed by plurality of appropriators according to an embodiment of the present disclosure.

In some embodiments, each of the plurality of receiving node devices is associated with each of the plurality of granting node devices, and then a transaction between the single receiving node device and the single granting node device is executed when the transaction is completed. FIG. 6 shows a transaction between a receiving node device and two granting node devices. Among them, the dotted lines represent a data flow of transaction from the granting node device 1 to a receiving account 1 of the receiving node device, and the solid lines represent a data flow of transaction from the granting node device 2 to a receiving account 2 of the receiving node device. The granting node device 1 first transfers the total amount that needs to be transferred to the virtual wallet 2 corresponding to the virtual wallet address 2 as the transaction address, and then transfers a first amount to the virtual wallet 1 corresponding to the virtual wallet address 1 and transfers a second amount to the virtual wallet 3 corresponding to the virtual wallet address 3 through the virtual wallet 2 corresponding to the virtual wallet address 2. Finally, the first amount is transferred from the virtual wallet 1 corresponding to the virtual wallet address 1 to the receiving account 1, and the second amount is transferred from the virtual wallet 3 corresponding to the virtual wallet address 3 to the receiving account 1. The granting node device 2 first transfers the total amount that needs to be transferred to the virtual wallet 1 corresponding to the virtual wallet address 1 as the transaction address, and then transfers a third amount to the virtual wallet 2 corresponding to the virtual wallet address 2 and transfers a fourth amount to the virtual wallet 3 corresponding to the virtual wallet address 3 through the virtual wallet 1 corresponding to the virtual wallet address 1. Finally, the third amount is transferred from the virtual wallet 2 corresponding to the virtual wallet address 2 to the receiving account 2, and the fourth amount is transferred from the virtual wallet 3 corresponding to the virtual wallet address 3 to the receiving account 2.

Figure 7:
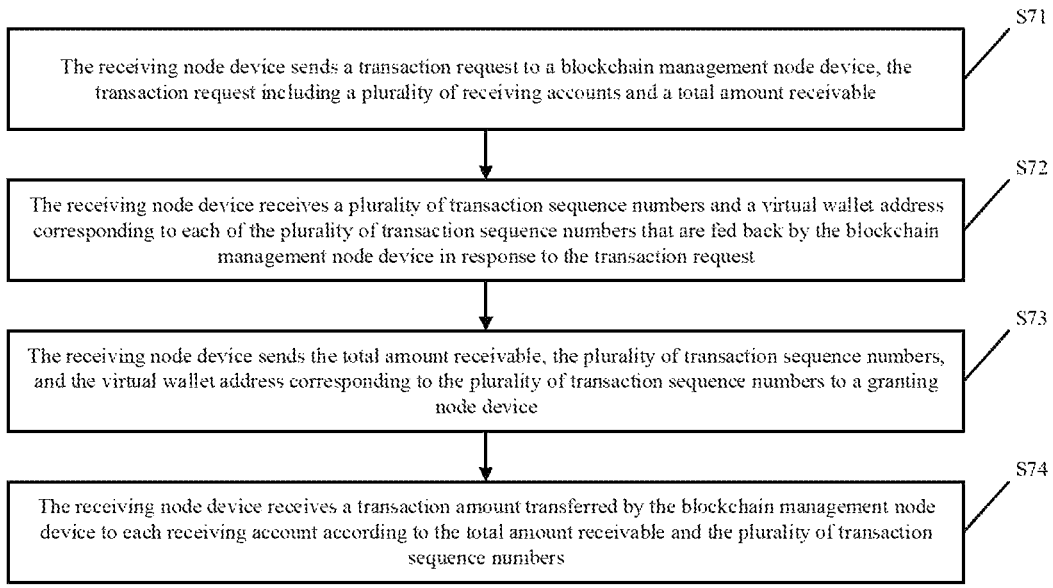
FIG. 7 shows a flowchart of a blockchain transaction privacy protection method according to another embodiment of the present disclosure.

FIG. 7 shows a flowchart of a blockchain transaction privacy protection method according to another embodiment of the present disclosure. The blockchain transaction privacy protection method is applied to receiving node devices. According to different needs, the order of the steps in the flowchart can be changed and some can be omitted.

In block S71, the receiving node device sends a transaction request to a blockchain management node device, the transaction request including a plurality of receiving accounts and a total amount receivable.

In block S72, the receiving node device receives a plurality of transaction sequence numbers and a virtual wallet address corresponding to each of the plurality of transaction sequence numbers that are fed back by the blockchain management node device in response to the transaction request.

In block S73, the receiving node device sends the total amount receivable, the plurality of transaction sequence numbers, and the virtual wallet address corresponding to the plurality of transaction sequence numbers to a granting node device.

After receiving the total amount receivable, the plurality of transaction sequence numbers, and the virtual wallet address corresponding to the plurality of transaction sequence numbers, the granting node device performs a transaction to receiving node device through the blockchain management node device.

In some embodiments, the granting node device sends a total amount receivable to the virtual wallet corresponding to the at least one virtual wallet address in the blockchain management node device.

The granting node device sends the plurality of transaction sequence numbers in addition to the total amount receivable, so that the blockchain management node device can determine a new transaction sequence number based on the plurality of transaction sequence numbers, thus, the transaction corresponding to the new transaction sequence number can be performed.

In block S74, the receiving node device receives a transaction amount transferred by the blockchain management node device to each receiving account according to the total amount receivable and the plurality of transaction sequence numbers.

In the above embodiment, the blockchain management node device is used as an intermediary to split the total amount receivable into a plurality of virtual wallets, and through the plurality of virtual wallets to complete the transfer operation to the granting node device, so it is impossible to intuitively determine the account addresses of both parties in the transaction, thereby protecting the privacy of both parties.

Figure 8:
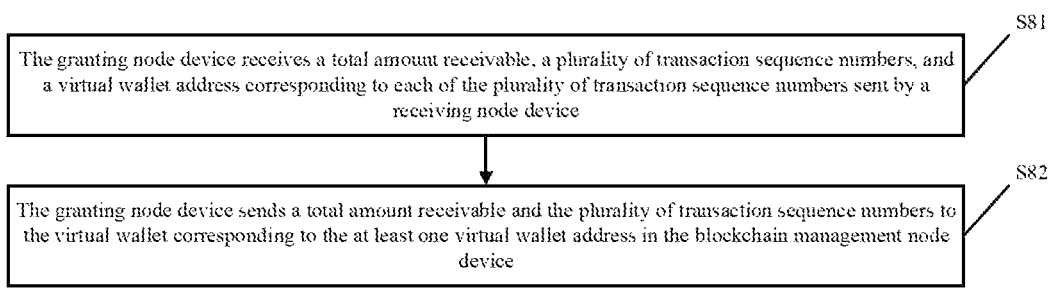
FIG. 8 shows a flowchart of a blockchain transaction privacy protection method according to another embodiment of the present disclosure.

FIG. 8 shows a flowchart of a blockchain transaction privacy protection method according to another embodiment of the present disclosure. The blockchain transaction privacy protection method is applied to granting node devices. According to different needs, the order of the steps in the flowchart can be changed, and some can be omitted.

In block S81, the granting node device receives a total amount receivable, a plurality of transaction sequence numbers, and a virtual wallet address corresponding to each of the plurality of transaction sequence numbers sent by a receiving node device.

In block S82, the granting node device sends a total amount receivable and the plurality of transaction sequence numbers to the virtual wallet corresponding to the at least one virtual wallet address in the blockchain management node device.

After receiving the total amount receivable and a plurality of transaction sequence numbers sent by the granting node device, the blockchain management node device transfers a transaction amount to each receiving account of the receiving node device according to the total amount receivable and the plurality of transaction sequence numbers. A sum of the transaction amount transferred to each receiving account is equal to the total amount receivable.

For the specific process of the blockchain management node device transferring a transaction amount to each receiving account of the receiving node device, reference should be made to the first embodiment and its related description.

Figure 9:
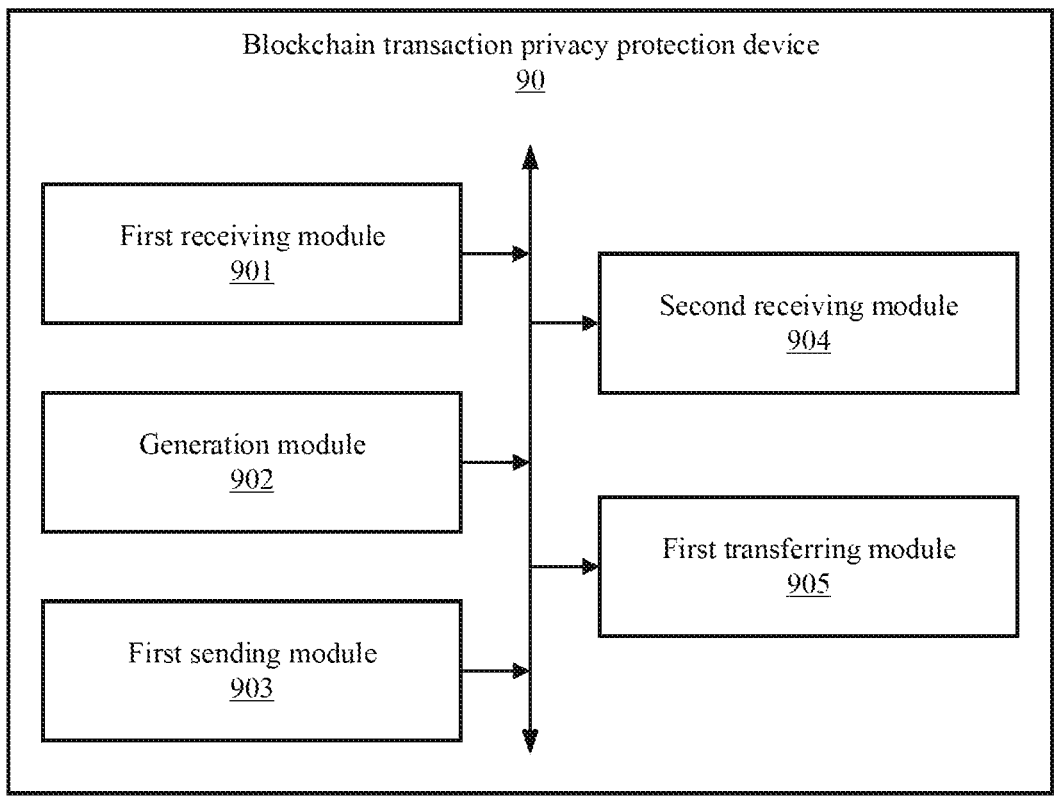
FIG. 9 shows a block diagram of a blockchain transaction privacy protection device according to an embodiment of the present disclosure.
Figure 10:
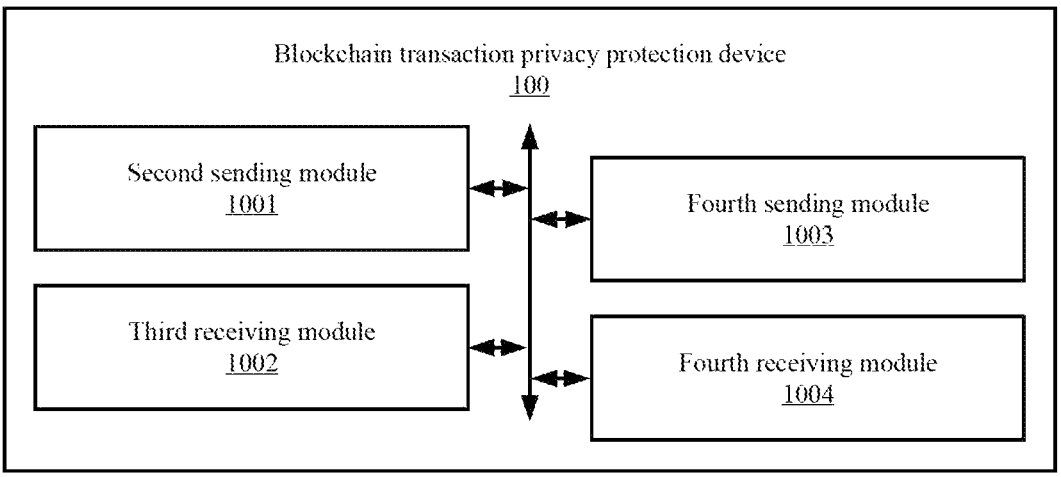
FIG. 10 shows a block diagram of a blockchain transaction privacy protection device according to another embodiment of the present disclosure.
Figure 11:
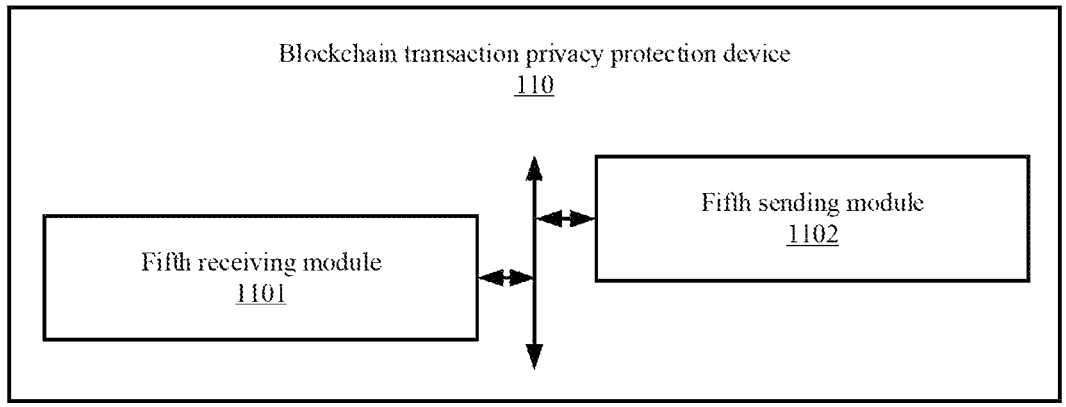
FIG. 11 shows a blockchain transaction privacy protection device according to another embodiment of the present disclosure.

The following describes the functional modules of the software device that implements the blockchain transaction privacy protection method and the hardware device architecture that implements the blockchain transaction privacy protection method in conjunction with FIGS. 9-11.

FIG. 9 shows a preferred embodiment of a blockchain transaction privacy protection device of the present disclosure.

In some embodiments, a blockchain transaction privacy protection device 90 runs in blockchain management node devices. The blockchain transaction privacy protection device 90 can include a plurality of function modules consisting of program code segments. The program code of each program code segments in the blockchain transaction privacy protection device 90 can be stored in a memory of the blockchain management node devices and executed by at least one processor to perform blockchain transaction privacy protection function.

In the embodiment, the blockchain transaction privacy protection device 90 in the blockchain management node devices can be divided into a plurality of functional modules, according to the performed functions. The functional modules can include: a first receiving module 901, a generation module 902, a first sending module 903, a second receiving module 904, and a first transferring module 905. A module as referred to in the present disclosure refers to a series of computer-readable instruction segments that can be executed by at least one processor and that are capable of performing fixed functions, which are stored in a memory. In some embodiment, the functions of each module will be detailed in the following embodiments.

The above-mentioned integrated unit implemented in a form of software functional modules can be stored in a non-transitory readable storage medium. The above software function modules are stored in a storage medium and includes several instructions for causing a computer device (which can be a personal computer, a dual-screen device, or a network device) or a processor to execute the method described in various embodiments in the present disclosure.

The first receiving module 901 is configured to receive a transaction request sent by a receiving node device, the transaction request including a plurality of receiving accounts and a total amount receivable.

A blockchain system can include one blockchain management node device, receiving node devices, and granting node devices. The blockchain management node device functions as an intermediate medium to split a total amount receivable sent by a granting node device into a plurality of transaction amounts, and individual transaction amounts within a plurality of virtual wallets are transferred to receiving accounts of a receiving node device. The receiving accounts are the available accounts of the receiving party, and the total amount receivable is a sum of the amount that the granting party must transfer to the receiving party.

The receiving node device sends the transaction request to the blockchain management node device to request virtual wallet addresses and transaction sequence numbers, thereby the granting node device can perform one or more transfers according to the virtual wallet addresses and the transaction sequence numbers.

The generation module 902 is configured to generate a plurality of transaction sequence numbers and a virtual wallet corresponding to each transaction sequence number in response to the transaction request.

As shown in FIG. 2, the receiving node device sends a transaction request to the blockchain management node device. After receiving the transaction request, the blockchain management node device calls the smart contract virtual wallet generator to generate a plurality of virtual wallets (for example, a virtual wallet 1, a virtual wallet 2, a virtual wallet 3), and returns a plurality of transaction sequence numbers and the virtual wallet address corresponding to the plurality of transaction sequence numbers to the receiving node device.

In an optional embodiment, the generation module 902 generating the plurality of transaction sequence numbers and the virtual wallet corresponding to each transaction sequence number in response to the transaction request includes:
   Randomly generating the plurality of transaction sequence numbers in response to the transaction request;
   Calling up a smart contract virtual wallet generator to generate a plurality of virtual wallets;
   Assigning at least one transaction address for each transaction sequence number;
   Setting a transaction amount and assigning a new transaction sequence number for each transaction address;
   Associating the transaction sequence number, the transaction address, the transaction amount, and the assigned new transaction sequence number in a transaction record table.

In this optional embodiment, the transaction address may be a virtual wallet address or a receiving account.

In conjunction with a transaction record table 1 shown in FIG. 3, the blockchain management node device randomly generates three transaction sequence numbers AAA, BBB, and CCC in response to the transaction request. Among them, the transaction sequence number AAA corresponds to two transaction addresses (a virtual wallet 1 and a virtual wallet 2), the transaction sequence number BBB corresponds to two transaction addresses (a receiving account 1 and a receiving account 2), and the transaction sequence number CCC corresponds to one transaction address (a receiving account 1). For the transaction address "virtual wallet 1", a specified transaction amount is 500 and a specified new transaction sequence number is BBB, and for the transaction address "Virtual Wallet 2", a specified transaction amount is 200 and a specified new transaction sequence number is CCC.

The first sending module 903 is configured to send a plurality of transaction sequence numbers and a virtual wallet address corresponding to each of the plurality of transaction sequence numbers to the receiving node device.

After the receiving node device receives the plurality of transaction sequence numbers and the virtual wallet address corresponding to the plurality of transaction sequence numbers, the receiving node device sends the total amount receivable, the plurality of transaction sequence numbers, and the virtual wallet address corresponding to the plurality of transaction sequence numbers to the granting node device.

The second receiving module 904 is configured to receive the total amount receivable and the plurality of transaction sequence numbers sent by a granting node device.

In an optional embodiment, the second receiving module 904 receiving the total amount receivable and the plurality of transaction sequence numbers sent by the granting node device includes: receiving the total amount receivable and the plurality of transaction sequence numbers through a virtual wallet corresponding to the virtual wallet address.

The first transferring module 905 is configured to transfer a transaction amount to each receiving account of the receiving node device according to the total amount receivable and the plurality of transaction sequence numbers.

A sum of the transaction amount transferred by the blockchain management node device to each receiving account of the receiving node device is the total amount receivable.

In an optional embodiment, The first transferring module 905 transferring the transaction amount to each receiving account of the receiving node device according to the total amount receivable and the plurality of transaction sequence numbers includes:
   Querying a new transaction sequence number corresponding to the plurality of transaction sequence numbers according to the transaction record table;
   Determining a new transaction amount and a new transaction address corresponding to the new transaction sequence number;
   Determining whether the new transaction address is a virtual wallet address or a receiving account;
   When the new transaction address is determined to be one of the plurality of receiving accounts, transferring the new transaction amount to the new transaction address;
   When the new transaction address is determined to be a virtual wallet address, transferring the new transaction amount to a virtual wallet corresponding to the new transaction address; querying a next new transaction sequence number corresponding to the new transaction address; performing a transfer operation according to the next new transaction sequence number and the transferred new transaction amount, until final transfer to the plurality of receiving accounts.

After receiving the transferred amount, each virtual wallet sends a query request carrying a transaction sequence number to the smart contract virtual wallet generator. The smart contract virtual wallet generator queries the transaction record table to obtain a query result including a next transaction address, transaction amount, and a next transaction sequence number corresponding to the transaction sequence number. The smart contract virtual wallet generator feeds back the query result to the virtual wallet. Then the virtual wallet performs a transfer operation corresponding to the next transaction sequence number.

In the above embodiment, the blockchain management node device is used as an intermediary to split the total amount receivable into a plurality of virtual wallets, and through the plurality of virtual wallets to complete the transfer operation to the granting node device, so it is impossible to intuitively determine the account addresses of both parties in the transaction, thereby protecting the privacy of both parties.

The following describes the blockchain transaction privacy protection method provided in the present disclosure, with reference to FIG. 4 and FIG. 5.

Assuming that the receiving node device sends a transaction request to the blockchain management node device, the transaction request carries a receiving account 1, a receiving account 2, and a total amount receivable 1000, and the blockchain management node device, in response to the transaction request, calls the smart contract virtual wallet generator to generate 5 virtual wallets (a virtual wallet 0, a virtual wallet 1, a virtual wallet 2, a virtual wallet 3, and a virtual wallet 4), and randomly generates 6 transaction sequence numbers (T0, T1, T2, T3, T4, T5), the association relationship between each transaction sequence number and the transaction address, transaction amount, and new transaction sequence number being recorded in a transaction record table 2 as shown in FIG. 4.

In a first step, the first sending module 903 sends the transaction sequence number T0 and a virtual wallet address 0 corresponding to the virtual wallet 0 to the receiving node device, and the receiving node device sends a transaction amount 1000, the transaction sequence number T0, and the virtual wallet address 0 to the granting node device.

In a second step, the granting node device sends the transaction amount 1000 and the transaction sequence number T0 to the virtual wallet 0 corresponding to the virtual wallet address 0.

In a third step, the virtual wallet 0 corresponding to the virtual wallet address 0 sends a query request carrying the transaction sequence number T0 to the smart contract virtual wallet generator. The smart contract virtual wallet generator queries the transaction record table 2 for the first time and obtains a result of first query: the transaction sequence number T0 corresponds to the new transaction sequence number T1, and the transaction sequence number T1 corresponds to two transaction addresses (the virtual wallet 1, 600, the new transaction sequence number T2; the virtual wallet 2, 400, the new transaction sequence number T3). The smart contract virtual wallet generator feeds back the result of first query to the virtual wallet 0 corresponding to the virtual wallet address 0. Then the virtual wallet 0 corresponding to the virtual wallet address 0 performs the transfer operation corresponding to the transaction sequence number T1: transfers 600 to the virtual wallet 1 corresponding to the virtual wallet address 1 and transfers 400 to the virtual wallet 2 corresponding to the virtual wallet address 2.

In a fourth step, the virtual wallet 1 corresponding to the virtual wallet address 1 sends a query request carrying the transaction sequence number T2 to the smart contract virtual wallet generator. The smart contract virtual wallet generator queries the transaction record table 2 for the second time and obtains a result of second query: the transaction sequence number T2 corresponds to two transaction addresses (the virtual wallet 3, 400, new transaction sequence number T4; receiving account 1, 200). The smart contract virtual wallet generator feeds back the result of second query to the virtual wallet 1 corresponding to the virtual wallet address 1. Then the virtual wallet 1 corresponding to the virtual wallet address 1 performs the transfer operation corresponding to the transaction sequence number T2: transfers 400 to the virtual wallet 3 corresponding to the virtual wallet address 3, and transfers 200 to the receiving account 1 as the transaction address.

In a fifth step, the virtual wallet 2 corresponding to the virtual wallet address 2 sends a query request carrying the transaction sequence number T3 to the smart contract virtual wallet generator. The smart contract virtual wallet generator queries the transaction record table 2 for the third time and obtains a result of third query: the transaction sequence number T3 corresponds to two transaction addresses (the virtual wallet 4, 300, new transaction sequence number T5; the receiving account 2, 100). The smart contract virtual wallet generator feeds back the result of third query to the virtual wallet whose transaction address is virtual wallet 2. Then the virtual wallet 2 corresponding to the virtual wallet address 2 performs the transfer operation corresponding to the transaction sequence number T3: transfers 300 to the virtual wallet 4 corresponding to the virtual wallet address 4, and transfers 100 to the receiving account 2 as the transaction address.

In a sixth step, the virtual wallet 3 corresponding to the virtual wallet address 3 sends a query request carrying the transaction sequence number T4 to the smart contract virtual wallet generator. The smart contract virtual wallet generator queries the transaction record table 2 for the fourth time and obtains a result of fourth query: the transaction sequence number T4 corresponds to two transaction addresses (the receiving account 1, 100; the receiving account 2, 300). The smart contract virtual wallet generator feeds back the result of fourth query to the virtual wallet 3 corresponding to the virtual wallet address 3. Then the virtual wallet 3 corresponding to the virtual wallet address 3 performs the transfer operation corresponding to the transaction sequence number T4: transfers 100 to the receiving account 1 and transfers 300 to the receiving account 2.

In a seventh step, the virtual wallet 4 corresponding to the virtual wallet address 4 sends a query request carrying the transaction sequence number T5 to the smart contract virtual wallet generator. The smart contract virtual wallet generator queries the transaction record table 2 for the fifth time and obtains a result of fifth query: the transaction sequence number T5 corresponds to two transaction addresses (the receiving account 1, 100; the receiving account 2, 200). The smart contract virtual wallet generator feeds back the result of fifth query to the virtual wallet 4 corresponding to the virtual wallet address 4. Then the virtual wallet 4 corresponding to the virtual wallet address 4 performs the transfer operation corresponding to the transaction sequence number T5: transfers 100 to the receiving account 1 and transfers 200 to the receiving account 2.

So far, transaction amount of 400 has been transferred into the receiving account 1, and transaction amount of 600 has been transferred into the receiving account 2.

The foregoing embodiments illustrate a transaction between a receiving node device and a granting node device. A transaction between a plurality of receiving node devices and one granting node device, a transaction between one receiving node device and a plurality of granting node devices, and a transaction between a plurality of receiving node devices and a plurality of granting node devices can take place with the same procedure.

In some embodiments, each of the plurality of receiving node devices is associated with each of the plurality of granting node devices, and then a transaction between the single receiving node device and the single granting node device is executed when the transaction is completed. FIG. 6 shows a transaction between a receiving node device and two granting node devices. Among them, the dotted lines represent a data flow of transaction from the granting node device 1 to a receiving account 1 of the receiving node device, and the solid lines represent a data flow of transaction from the granting node device 2 to a receiving account 2 of the receiving node device. The granting node device 1 first transfers the total amount that needs to be transferred to the virtual wallet 2 corresponding to the virtual wallet address 2 as the transaction address, and then transfers a first amount to the virtual wallet 1 corresponding to the virtual wallet address 1 and transfers a second amount to the virtual wallet 3 corresponding to the virtual wallet address 3 through the virtual wallet 2 corresponding to the virtual wallet address 2. Finally, the first amount is transferred from the virtual wallet 1 corresponding to the virtual wallet address 1 to the receiving account 1, and the second amount is transferred from the virtual wallet 3 corresponding to the virtual wallet address 3 to the receiving account 1. The granting node device 2 first transfers the total amount that needs to be transferred to the virtual wallet 1 corresponding to the virtual wallet address 1 as the transaction address, and then transfers a third amount to the virtual wallet 2 corresponding to the virtual wallet address 2 and transfers a fourth amount to the virtual wallet 3 corresponding to the virtual wallet address 3 through the virtual wallet 1 corresponding to the virtual wallet address 1. Finally, the third amount is transferred from the virtual wallet 2 corresponding to the virtual wallet address 2 to the receiving account 2, and the fourth amount is transferred from the virtual wallet 3 corresponding to the virtual wallet address 3 to the receiving account 2.

FIG. 10 shows a flowchart of a blockchain transaction privacy protection device according to another embodiment of the present disclosure.

In some embodiments, a blockchain transaction privacy protection device 100 runs in receiving node devices. The blockchain transaction privacy protection device 100 can include a plurality of function modules consisting of program code segments. The program code of each program code segments in the blockchain transaction privacy protection device 100 can be stored in a memory of the receiving node devices and executed by at least one processor to perform blockchain transaction privacy protection function.

In the embodiment, the blockchain transaction privacy protection device 100 in the receiving node devices can be divided into a plurality of functional modules, according to the performed functions. The functional modules can include: a second sending module 1001, a third receiving module 1002, a fourth sending module 1003, and a fourth receiving module 1004. A module as referred to in the present disclosure refers to a series of computer-readable instruction segments that can be executed by at least one processor and that are capable of performing fixed functions, which are stored in a memory. In some embodiment, the functions of each module will be detailed in the following embodiments.

The second sending module 1001 is configured to send a transaction request to a blockchain management node device, the transaction request including a plurality of receiving accounts and a total amount receivable.

The third receiving module 1002, is configured to receive a plurality of transaction sequence numbers and a virtual wallet address corresponding to each of the plurality of transaction sequence numbers that are fed back by the blockchain management node device in response to the transaction request.

The fourth sending module 1003 is configured to send the total amount receivable, the plurality of transaction sequence numbers, and the virtual wallet address corresponding to the plurality of transaction sequence numbers to a granting node device.

After receiving the total amount receivable, the plurality of transaction sequence numbers, and the virtual wallet address corresponding to the plurality of transaction sequence numbers, the granting node device performs a transaction to receiving node device through the blockchain management node device.

In some embodiments, the granting node device sends a total amount receivable to the virtual wallet corresponding to the at least one virtual wallet address in the blockchain management node device.

The granting node device sends the plurality of transaction sequence numbers in addition to the total amount receivable, so that the blockchain management node device can determine a new transaction sequence number based on the plurality of transaction sequence numbers, thus, the transaction corresponding to the new transaction sequence number can be performed.

The fourth receiving module 1004 is configured to receive a transaction amount transferred by the blockchain management node device to each receiving account according to the total amount receivable and the plurality of transaction sequence numbers.

In the above embodiment, the blockchain management node device is used as an intermediary to split the total amount receivable into a plurality of virtual wallets, and through the plurality of virtual wallets to complete the transfer operation to the granting node device, so it is impossible to intuitively determine the account addresses of both parties in the transaction, thereby protecting the privacy of both parties.

FIG. 11 shows a flowchart of a blockchain transaction privacy protection device according to another embodiment of the present disclosure.

In some embodiments, a blockchain transaction privacy protection device 110 runs in granting node devices. The blockchain transaction privacy protection device 110 can include a plurality of function modules consisting of program code segments. The program code of each program code segments in the blockchain transaction privacy protection device 110 can be stored in a memory of the granting node devices and executed by at least one processor to perform blockchain transaction privacy protection function.

In the embodiment, the blockchain transaction privacy protection device 110 in the granting node devices can be divided into a plurality of functional modules, according to the performed functions. The functional modules can include: a fifth receiving module 1101 and a fifth sending module 1102. A module as referred to in the present disclosure refers to a series of computer-readable instruction segments that can be executed by at least one processor and that are capable of performing fixed functions, which are stored in a memory. In some embodiment, the functions of each module will be detailed in the following embodiments.

The fifth receiving module 1101 is configured to receive a total amount receivable, a plurality of transaction sequence numbers, and a virtual wallet address corresponding to each of the plurality of transaction sequence numbers sent by a receiving node device.

The fifth sending module 1102 is configured to send a total amount receivable and the plurality of transaction sequence numbers to the virtual wallet corresponding to the at least one virtual wallet address in the blockchain management node device.

After receiving the total amount receivable and a plurality of transaction sequence numbers sent by the granting node device, the blockchain management node device transfers a transaction amount to each receiving account of the receiving node device according to the total amount receivable and the plurality of transaction sequence numbers. A sum of the transaction amount transferred to each receiving account is equal to the total amount receivable.

For the specific process of the blockchain management node device transferring a transaction amount to each receiving account of the receiving node device, reference should be made to the first embodiment and its related description.

Figure 12:
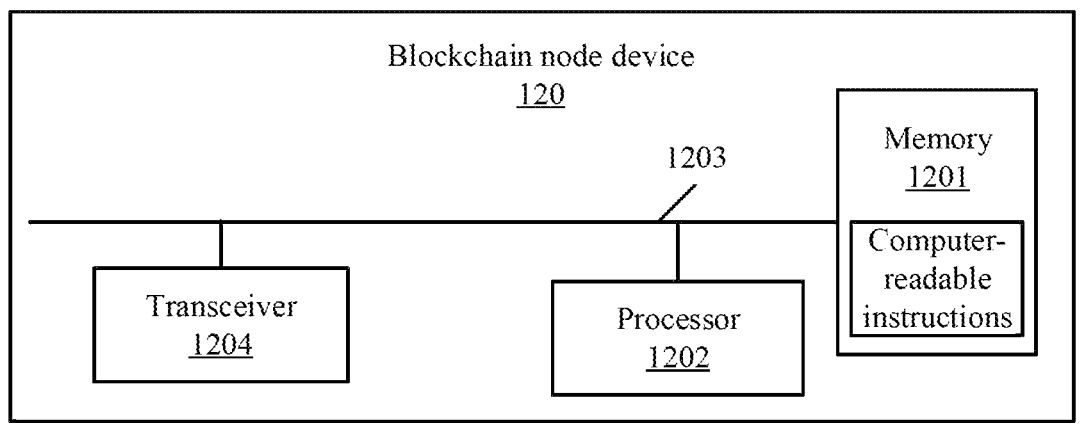
FIG. 12 shows a schematic structural diagram of a blockchain node device according to an embodiment of the present disclosure.

FIG. 12 shows a schematic structural diagram of a blockchain node device according to an embodiment of the present disclosure.

The blockchain node device 120 may include: a memory 1201, at least one processor 1202, at least one communication bus 1203, and a transceiver 1204.

The memory 1201 stores computer-readable instructions and the at least one processor 1202 executes the computer-readable instructions to implement the steps in the blockchain transaction privacy protection method described above.

Exemplarily, the computer-readable instructions can be divided into one or more modules/units, and the one or more modules/units are stored in the memory 1201 and executed by the at least one processor 1202 to complete the blockchain transaction privacy protection method of the present disclosure. The one or more modules/units can be a series of computer-readable instruction segments capable of performing specific functions, and the instruction segments are used to describe execution processes of the computer-readable instructions in the blockchain node device 120.

The blockchain node device 120 can be a computing device such as a desktop computer, a notebook, a palmtop computer, and a cloud server. Those skilled in the art will understand that the schematic diagram 12 is only an example of the blockchain node device 120, and does not constitute a limitation on the blockchain node device 120. Another blockchain node device 120 may include more or fewer components than shown in the figures, or combine some components, or have different components. For example, the blockchain node device 120 may further include an input/output device, a network access device, a bus, and the like.

The at least one processor 1202 can be a central processing unit (CPU), or can be other general-purpose processor, digital signal processor (DSPs), and application specific integrated circuit (ASIC), Field-Programmable Gate Array (FPGA), or other programmable logic device, discrete gate, or transistor logic device, or discrete hardware component, etc. The processor 1202 can be a microprocessor, or the processor 1202 can be any conventional processor. The processor 1202 is a control center of the blockchain node device 120, and connects various parts of the entire blockchain node device 120 by using various interfaces and lines.

The memory 1201 can be configured to store the computer-readable instructions 33 and/or modules/units. The processor 32 may run or execute the computer-readable instructions and/or modules/units stored in the memory 1201, and may call up data stored in the memory 1201 to implement various functions of the blockchain node device 120. The memory 1201 mainly includes a storage program area and a storage data area. The storage program area may store an operating system, an application program required for at least one function (such as a sound playback function, an image playback function, etc.), etc. The storage data area may store data (such as audio data, a phone book, etc.) created according to use of the blockchain node device 120. In addition, the memory 1201 may include random access memory, and may also include a non-transitory storage medium, such as a hard disk, an internal memory, a plug-in hard disk, a smart media card (SMC), and a secure digital (SD) Card, a flash card, at least one disk storage device, a flash memory device, or other non-transitory solid-state storage device.

When the modules/units integrated in the blockchain node device 120 are implemented in the form of software functional units and sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, a recording medium, a U disk, a mobile hard disk, a magnetic disk, an optical disk, a computer memory, or a read-only memory (ROM).

In several embodiments provided in the preset application, it should be understood that the disclosed blockchain node devices and method can be implemented in other ways. For example, the embodiments of the devices described above are merely illustrative. For example, divisions of the units are only divisions according to logical functions, and there can be other manners of division in actual implementation.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The present disclosure is not limited to the details of the above-described exemplary embodiments, and the present disclosure can be embodied in other specific foul's without departing from the spirit or essential characteristics of the present disclosure. Therefore, the present embodiments are to be considered as illustrative and not restrictive, and the scope of the present disclosure is to be defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

What is claimed is:

1. A blockchain transaction privacy protection method, executed by a blockchain management node device, the method comprising:
   receiving, by a blockchain management node device, a transaction request, the transaction request comprising a plurality of receiving accounts and a total amount receivable from a receiving node device;
   randomly generating, by the blockchain management node device, a plurality of transaction sequence numbers in response to the transaction request;
   generating, by a smart contract virtual wallet generator, a plurality of virtual wallets, the plurality of the virtual wallets corresponding to the plurality of transaction sequence numbers;
   assigning, by the blockchain management node device, at least one transaction address for each of the transaction sequence numbers;
   setting, by the blockchain management node device, a transaction amount and assigning a new transaction sequence number for each of the at least one transaction address;
   associating, by the blockchain management node device, the transaction sequence number, the transaction address, the transaction amount and the new transaction sequence number in a transaction record table;
   sending, by the blockchain management node device, the plurality of transaction sequence numbers and a virtual wallet address corresponding to each of the plurality of transaction sequence numbers to the receiving node device, thereby making the receiving node device send a total amount receivable, the plurality of transaction sequence numbers, and the virtual wallet address corresponding to the plurality of transaction sequence numbers to a granting node device;
   receiving, by the blockchain management node device, a total amount receivable and the plurality of transaction sequence numbers sent by the granting node device; and
   transferring, by the blockchain management node device, a transaction amount to each receiving account of the receiving node device according to the total amount receivable and the plurality of transaction sequence numbers, wherein the transferring, by the blockchain management node device, the transaction amount to each receiving account of the receiving node device according to the total amount receivable and the plurality of transaction sequence numbers to protect privacy of the receiving node device and the granting node device comprises:
   querying, by the blockchain management node device, the new transaction sequence number corresponding to the plurality of transaction sequence numbers according to the transaction record table;
   determining, by the blockchain management node device, a new transaction amount and a new transaction address corresponding to the new transaction sequence number;
   determining, by the blockchain management node device, whether the new transaction address is a virtual wallet address or a receiving account;
   when the new transaction address is determined to be one of the plurality of receiving accounts, transferring, by the blockchain management node device, the new transaction amount to the new transaction address;
   when the new transaction address is determined to be a virtual wallet address, transferring, by the blockchain management node device, the new transaction amount to a virtual wallet corresponding to the new transaction address;
   querying, by the blockchain management node device, a next new transaction sequence number corresponding to the new transaction address;
   performing, by the blockchain management node device, a transfer operation according to the next new transaction sequence number and the transferred new transaction amount, until all of the receivable amount is transferred to the plurality of receiving accounts.

2. The blockchain transaction privacy protection method of claim 1, wherein the receiving, by the blockchain management node device, the total amount receivable and the plurality of transaction sequence numbers sent by the granting node device comprises:
   receiving, by the blockchain management node device, the total amount receivable and the plurality of transaction sequence numbers through a virtual wallet corresponding to the virtual wallet address.

3. A blockchain management node device comprising:
   a memory; and
   a processor;
   the memory stores at least one computer-readable instruction; and
   the processor executes the at least one computer-readable instruction to implement the following steps:
   receiving, by a blockchain management node device, a transaction request, the transaction request comprising a plurality of receiving accounts and a total amount receivable from a receiving node device;
   randomly generating, by the blockchain management node device, a plurality of transaction sequence numbers in response to the transaction request;
   generating, by a smart contract virtual wallet generator, a plurality of virtual wallets, the plurality of the virtual wallets corresponding to the plurality of transaction sequence numbers;
   assigning, by the blockchain management node device, at least one transaction address for each transaction sequence number;
   setting, by the blockchain management node device, a transaction amount and assigning a new transaction sequence number for each transaction address;
   associating, by the blockchain management node device, the transaction sequence number, the transaction address, the transaction amount and the new transaction sequence number in a transaction record table;
   sending, by the blockchain management node device, the plurality of transaction sequence numbers and a virtual wallet address corresponding to each of the plurality of transaction sequence numbers to the receiving node device, to make the receiving node device send a total amount receivable, the plurality of transaction sequence numbers, and the virtual wallet address corresponding to the plurality of transaction sequence numbers to a granting node device;

receiving, by the blockchain management node device, a total amount receivable and the plurality of transaction sequence numbers sent by the granting node device; and transferring, by the blockchain management node device, a transaction amount to each receiving account of the receiving node device according to the total amount receivable and the plurality of transaction sequence numbers, wherein the transferring, by the blockchain management node device, the transaction amount to each receiving account of the receiving node device according to the total amount receivable and the plurality of transaction sequence numbers to protect privacy of the receiving node device and the granting node device comprises:

querying, by the blockchain management node device, the new transaction sequence number corresponding to the plurality of transaction sequence numbers according to the transaction record table;

determining, by the blockchain management node device, a new transaction amount and a new transaction address corresponding to the new transaction sequence number;

determining, by the blockchain management node device, whether the new transaction address is a virtual wallet address or a receiving account;

when the new transaction address is determined to be one of the plurality of receiving accounts, transferring, by the blockchain management node device, the new transaction amount to the new transaction address;

when the new transaction address is determined to be a virtual wallet address, transferring, by the blockchain management node device, the new transaction amount to a virtual wallet corresponding to the new transaction address;

querying, by the blockchain management node device, a next new transaction sequence number corresponding to the new transaction address;

performing, by the blockchain management node device, a transfer operation according to the next new transaction sequence number and the transferred new transaction amount, until all of the receivable amount is transferred to the plurality of receiving accounts.

4. The blockchain management node device of claim 3, wherein the receiving, by the blockchain management node device, the total amount receivable and the plurality of transaction sequence numbers sent by the granting node device comprises:

receiving, by the blockchain management node device, the total amount receivable and the plurality of transaction sequence numbers through a virtual wallet corresponding to the virtual wallet address.

5. A non-transitory storage medium having stored thereon at least one computer-readable instructions that, when the at least one computer-readable instructions are executed by a processor to implement the following steps:

receiving, by a blockchain management node device, a transaction request, the transaction request comprising a plurality of receiving accounts and a total amount receivable from a receiving node device;

randomly generating, by the blockchain management node device, a plurality of transaction sequence numbers in response to the transaction request;

generating, by a smart contract virtual wallet generator, a plurality of virtual wallets, the plurality of the virtual wallets corresponding to the plurality of transaction sequence numbers;

assigning, by the blockchain management node device, at least one transaction address for each transaction sequence number;

setting, by the blockchain management node device, a transaction amount and assigning a new transaction sequence number for each transaction address;

associating, by the blockchain management node device, the transaction sequence number, the transaction address, the transaction amount and the new transaction sequence number in a transaction record table;

sending, by the blockchain management node device, the plurality of transaction sequence numbers and a virtual wallet address corresponding to each of the plurality of transaction sequence numbers to the receiving node device, to make the receiving node device send a total amount receivable, the plurality of transaction sequence numbers, and the virtual wallet address corresponding to the plurality of transaction sequence numbers to a granting node device;

receiving, by the blockchain management node device, a total amount receivable and the plurality of transaction sequence numbers sent by the granting node device; and transferring, by the blockchain management node device, a transaction amount to each receiving account of the receiving node device according to the total amount receivable and the plurality of transaction sequence numbers;

wherein the transferring, by the blockchain management node device, the transaction amount to each receiving account of the receiving node device according to the total amount receivable and the plurality of transaction sequence numbers to protect privacy of the receiving node device and the granting node device comprises:

querying, by the blockchain management node device, the new transaction sequence number corresponding to the plurality of transaction sequence numbers according to the transaction record table;

determining, by the blockchain management node device, a new transaction amount and a new transaction address corresponding to the new transaction sequence number;

determining, by the blockchain management node device, whether the new transaction address is a virtual wallet address or a receiving account;

when the new transaction address is determined to be one of the plurality of receiving accounts, transferring, by the blockchain management node device, the new transaction amount to the new transaction address;

when the new transaction address is determined to be a virtual wallet address, transferring, by the blockchain management node device, the new transaction amount to a virtual wallet corresponding to the new transaction address;

querying, by the blockchain management node device, a next new transaction sequence number corresponding to the new transaction address;

performing, by the blockchain management node device, a transfer operation according to the next new transaction sequence number and the transferred new transaction amount, until all of the receivable amount is transferred to the plurality of receiving accounts.

6. The non-transitory storage medium of claim 5, wherein the receiving, by the blockchain management node device, the total amount receivable and the plurality of transaction sequence numbers sent by the granting node device comprises:
    receiving, by the blockchain management node device, the total amount receivable and the plurality of transaction sequence numbers through a virtual wallet corresponding to the virtual wallet address.

\* \* \* \* \*